(12) United States Patent
Sprague

(10) Patent No.: US 8,638,817 B2
(45) Date of Patent: Jan. 28, 2014

(54) COMMUNICATION SYSTEM

(75) Inventor: Edward E. Sprague, Woodside, CA (US)

(73) Assignee: Infinera Corporation, Sunnyvale, CA (US)

( * ) Notice: Subject to any disclaimer, the term of this patent is extended or adjusted under 35 U.S.C. 154(b) by 728 days.

(21) Appl. No.: 12/647,324

(22) Filed: Dec. 24, 2009

(65) Prior Publication Data
US 2011/0158255 A1 Jun. 30, 2011

(51) Int. Cl.
*H04J 3/16* (2006.01)
(52) U.S. Cl.
USPC .......................................................... 370/472
(58) Field of Classification Search
USPC ......... 370/252, 253, 254, 230, 229, 235, 232, 370/310, 381, 374, 368, 363, 389, 429, 412, 370/472, 471, 473, 474
See application file for complete search history.

(56) References Cited

U.S. PATENT DOCUMENTS

| | | | | |
|---|---|---|---|---|
| 2002/0075908 A1* | 6/2002 | Lee et al. | | 370/539 |
| 2004/0042474 A1* | 3/2004 | Walker et al. | | 370/412 |
| 2004/0042500 A1* | 3/2004 | Christiansen | | 370/509 |
| 2004/0062277 A1* | 4/2004 | Flavin et al. | | 370/474 |
| 2004/0156325 A1* | 8/2004 | Perkins et al. | | 370/299 |
| 2006/0104309 A1* | 5/2006 | Vissers et al. | | 370/474 |
| 2007/0248121 A1* | 10/2007 | Zou | | 370/498 |
| 2008/0240077 A1* | 10/2008 | Freiberger | | 370/351 |
| 2008/0267223 A1* | 10/2008 | Meagher et al. | | 370/505 |
| 2010/0142947 A1* | 6/2010 | Shin et al. | | 398/43 |

\* cited by examiner

*Primary Examiner* — Abdullah Riyami
(74) *Attorney, Agent, or Firm* — David L. Soltz

(57) ABSTRACT

Consistent with the present disclosure, a communication system is provided in which client data is received and provided in frames for transmission within the system. The frames include an overhead portion as well as locations that include the client data. The frames further include phase data or "virtual justifications" that periodically correct the difference between the phase represented by the data locations in the wrapper and the actual accumulated client phase. The phase data or virtual justifications, however, are decoupled from the data path. Therefore, without complicating the data path, the phase data may be sent more frequently and with finer granularity than the actual justifications. Virtual justifications or phase data are communicated via a "virtual justification control channel" which may part of the frame overhead. Moreover, there is no need for an actual "virtual justification opportunity" in the frame, because no data is actually sent in conjunction with the virtual justifications.

21 Claims, 12 Drawing Sheets

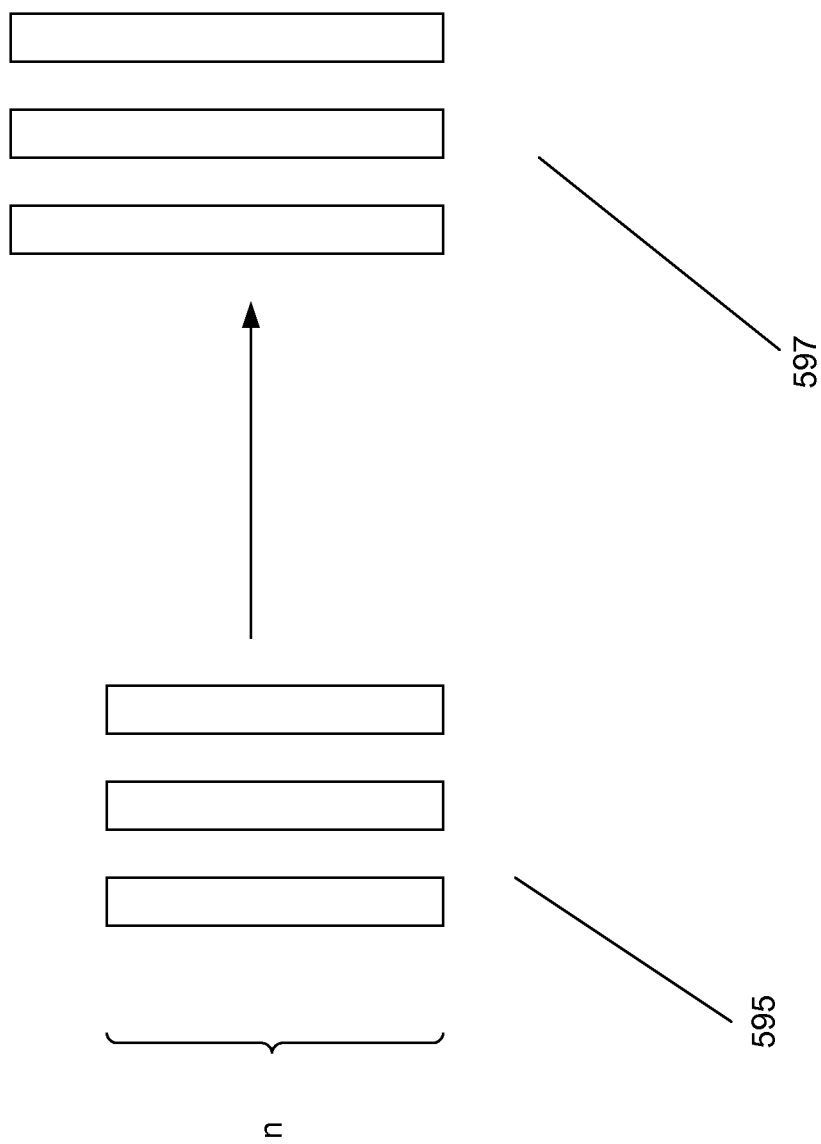

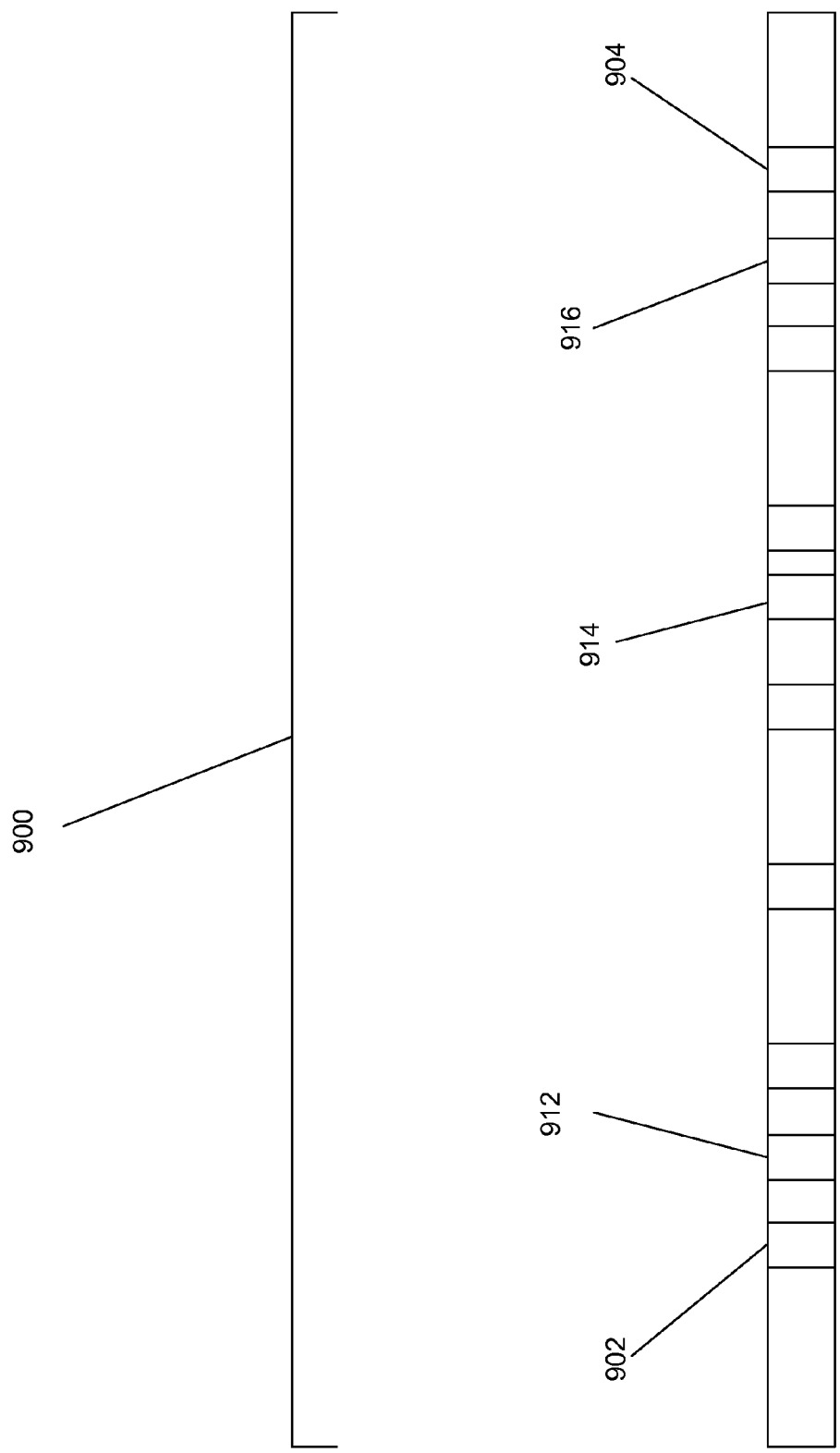

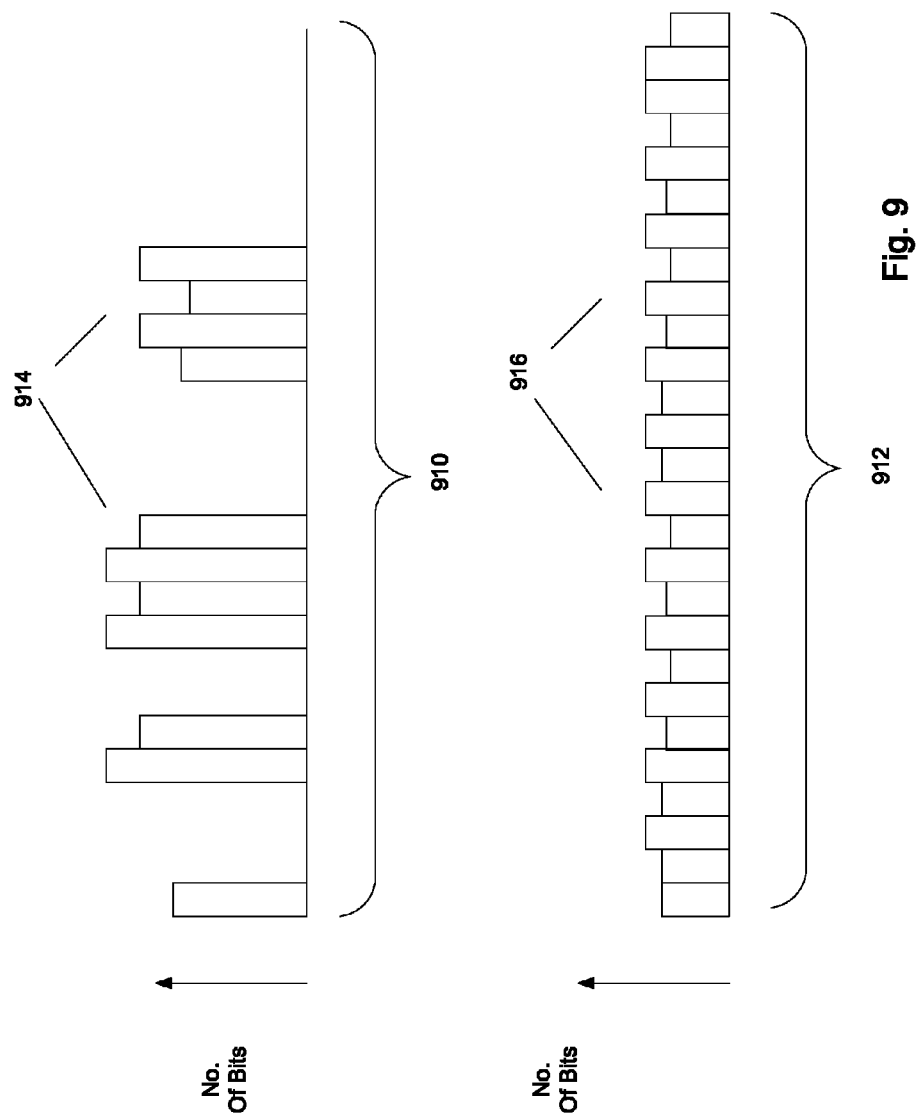

COMMUNICATION SYSTEM

BACKGROUND OF THE INVENTION

In digital communications systems it is often advantageous to embed a client signal for transport in a series of 'wrappers' or frames of fixed length and repetition rate. Two such sequential frames 100 and 110 are shown in FIG. 1. Within each wrapper or frame 100 and 110, there are fixed locations 102 that carry the client data. There may additionally be locations that carry different and/or unrelated client signals, as well as overhead locations that support transport of the client signal and other functions.

Often, it is advantageous for the wrapper, e.g., frame 100 to have a frequency that is not locked (is asynchronous or plesiochronous) to the embedded client signal. Furthermore, it is sometimes required to maintain, at the client egress, substantially the same bit rate that the client had upon ingress. Such a relationship may be required, for example, when "full transparency" is required for the client transport, meaning that the exact bit sequence is replicated from ingress to egress. To meet these joint requirements, "asynchronous mapping" may be used to encapsulate the client signal in the wrapper. For example, as shown in FIG. 1, there are, in addition to the fixed client data locations 102, variable stuff locations 104 and 106 in frames 100 and 110 that contain, or do not contain, client data. By variably 'stuffing' (inserting null data) in variable stuff location, such as location 104, or inserting actual client data, e.g., in location 106, the client signal may be transported in a bit-for-bit transparent manner, and the ingress and egress client frequencies are the same, when measured over an extended period of time. The variable stuff locations 104 and 106 are often called "justification opportunities". In frame 100, the justification opportunity may be signaled from the transmitter to the receiver whether or not each justification opportunity carries data or stuffing; the signaling channel reserved for this purpose is often called "justification control".

FIG. 2 shows a transmitter including typical asynchronous mapping circuit 200. Mapping circuit 200 includes a clock and data recovery (CDR) circuit 202 that receives client data carried by an incoming client signal. The client data, which is received in serial form, is converted into a parallel stream of successive parallel n-bit words by serial to parallel converter circuit 203. The words are fed to a first-in-first-out (FIFO) memory or buffer 206. Such serial-to-parallel conversion is done to limit the rate at which data can be toggled, so that the data processing can be performed with a relatively low cost, high-density logic device, such as a complementary metal-oxide-semiconductor (CMOS) device. CDR circuit 202 also generates a clock signal that is fed to a divide-by-n circuit 204 (n being the parallel word width), which, in turn, supplies a further clock signal having an appropriate frequency to control the storage of data into FIFO buffer 206.

The contents of FIFO buffer 206 are supplied to a multiplexer 212 which combines justification control bits and the contents of FIFO buffer 206 into additional n-bit wide parallel words. Multiplexer 212 operates under control of a wrapper frame assembly state machine 210 that receives a clock signal from a free running transmitter clock 208 and is thus synchronous with this clock. Clock 208 also supplies a clock signal to FIFO 206 to control the output of data to multiplexer 212. The data output from FIFO 206 is selected by state machine 210 for each n-bit word in an output frame. For fixed client data locations, the data is derived from the output of FIFO 206. For justification opportunities, the wrapper or frame data is derived from either the data stored in FIFO 206 or a stuff value, depending upon the FIFO status. Namely, if the data fill level of FIFO 206 is above a threshold (as indicated, for example, by a half-fill indicator), state machine 206 may place data in the justification opportunity. If the fill level of FIFO 206 is below the threshold, state machine 210 may stuff the justification opportunity with null data. Justification control is also inserted in the frame in order to inform the receiver whether each justification opportunity contains client data or null bits or data, for example.

As further shown in FIG. 2, multiplexer 212 may also receive other inputs, in addition to the data from FIFO 206 and the justification control information, for example, overhead and additional client data channels. The n-bit wide parallel words output from multiplexer 212 are next fed to a parallel-to-serial converter 214, which, in turn, supplies a serial data stream that is provided to a transmitter (not shown) that may include a laser. That transmitter outputs a serialized optical output that includes the frames noted above. Preferably, the parallel data width n is chosen such that the wrapper frame construction is feasible, efficient and cost-effective given the appropriate logic technology (e.g., CMOS) included in the electronics of the transmitter.

FIG. 3 shows receiver circuitry 300 that decapsulates incoming frames and extracts the client data included therein. The frames are supplied to a clock and data recover circuit 302, which outputs data to a serial-to-parallel conversion circuit 303 and a clock signal to a divide-by-n circuit 304. Such serial-to-parallel conversion generates parallel n-bit wide words and is done to improve efficiency and/or to make the circuit realizable in a technology that is available and cost effective. The parallel words generated in receiver circuitry 300, however, may not necessarily have the same width as the parallel words generated in mapping circuit 200. Data is fed to a first-in-first-out (FIFO) memory or buffer 306, and divide-by-n circuit 304 supplies a clock with an appropriate frequency to a wrapper frame disassembly state machine 310 and client clock synthesis circuit 318. State machine 310 distinguishes client data (including justification opportunities) within the wrapper frame, such that only the client data is stored in FIFO buffer 306. Separately, clock synthesis circuit 318 synthesizes the clock or frequency of the client signal received by mapping circuit 200 by processing the received wrapper clock or frequency, fixed client data locations, and the justification control channel.

In particular, the client frequency is synthesized by processing the client phase information that is implicit in the received wrapper. An n-bit unit of client data that is received in a fixed client data location represents a phase advance of n wrapper bit-times. A n-bit unit of client data that is received in a justification opportunity (e.g., location 106 in FIG. 1) similarly represents a phase advance of n wrapper bit times. A stuffed justification opportunity (e.g., location 104 in FIG. 1) represents a phase advance of 0 bit times. It can be seen that the joint transmitter and receiver mechanisms described above operate such that no phase information is lost over an extended period of time; the net phase advance or phase determined by the receiver's client clock synthesizer exactly matches the client data received by the transmitter:

$$\phi_{client}(t) = \sum_{\tau=0}^{t} [(D_F + D_J)] * n * B_w$$

$\phi_{client}(t)$=net client phase advance
$D_F$=fixed data units received $D_j$=data units received in justification opportunities
n=the size in bits of each word in the frame
$B_W$=wrapper bit time The communicated client signal frequency can be determined from the above equation by taking the time derivative of each side of the equation.

In the bit-for-bit transmission of client signals or data, it is often advantageous or even required to minimize the generation of jitter and wander via the overall transmission processes. Jitter and wander generation represent a deviation in time from the temporal position of each transmitted bit or symbol at which it was received at the client ingress to mapping circuit 200 (neglecting a fixed transport delay). Frequency components of this deviation above 10 Hz are termed "jitter" and components below 10 Hz are termed "wander". For example, minimal jitter and wander generation may be required for the transmission of SONET/SDH client signals.

FIG. 4*a* is an example of a timing diagram that shows phase or phase advance (401) and cumulative or accumulated phase advance (curve 402) relative to the transmission of frames 100 and 110. In the transmission/receive process described above, the communication of phase information (i.e., the cumulative phase advance 402) is distributed in fixed units of n wrapper bit times. In the example shown in FIG. 4*a*, this quantization of the phase advance information represents an error $\phi_e(t)$ in the phase (404).

Since the phase error 404 represents a deviation from the ideal phase (curve 406), the phase error can be treated as jitter and wander. In general, the generated jitter and wander can be removed from the signal by filtering in a phase-lock loop (PLL) that is part of the client clock synthesis circuit 318. However, there are two limitations in this regard. First, the low-pass cutoff frequency fc of the PLL is subject to practical limitations. Second, in some cases it is required to reproduce some components of the client signal wander that may have existed at the client ingress to mapping circuit 200 (normally, those components below a specified frequency $f_R$). The receiver circuit 300 may have no information by which it can discriminate which wander components existed in the original client signal client input to mapping circuit 200 and which were induced by the transmission process. Therefore, filtering of the generated wander may preclude preservation of the characteristics of the original signal.

SUMMARY

Consistent with the present disclosure, a communication system is provided that comprises an ingress node and an egress node. The ingress node includes a first input configured to receive a first client signal, which has an associated first frequency and carries client data. The ingress node has a first output configured to supply a first frame that includes first portions of the client data, first stuff bytes, and first justification control (JC) bytes. The first JC bytes indicate whether the first stuff bytes include second portions of the client data, and the first frame has an associated second frequency. The first portions of the client data, the first stuff bytes, and the first JC bytes being included in a first channel. In addition, the ingress node includes first circuitry configured to supply first virtual justification control (VJC) bytes in a second channel.

The egress node includes a second input configured to receive a second frame that includes third portions of the client data, second stuff bytes, and second justification control (JC) bytes. The second JC bytes indicate whether the stuff bytes include fourth portions of the client data. The second frame has the associated second frequency. The third portions of the client data, the second stuff bytes, and the second JC bytes are included in the first channel. The second input further receives second VJC bytes, which are included in the second channel. A second output is also provided in the egress node that is configured to supply a second client signal including the first portions of the client data. The first frequency is also associated with the second client signal. Moreover, second circuitry is provided in the egress node that is configured to generate the first frequency, at least in part, based on the second VJC bytes.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the present disclosure.

BRIEF DESCRIPTION OF THE DRAWINGS

FIG. 5*b* illustrates examples of parallel client words and frame words consistent with an additional aspect of the present disclosure;

FIG. 5*c* illustrates an example of a frame consistent with the present disclosure;

FIG. 9 illustrates an example of real and virtual frames consistent with an aspect of the present disclosure.

DESCRIPTION OF THE EMBODIMENTS

Figure 1:
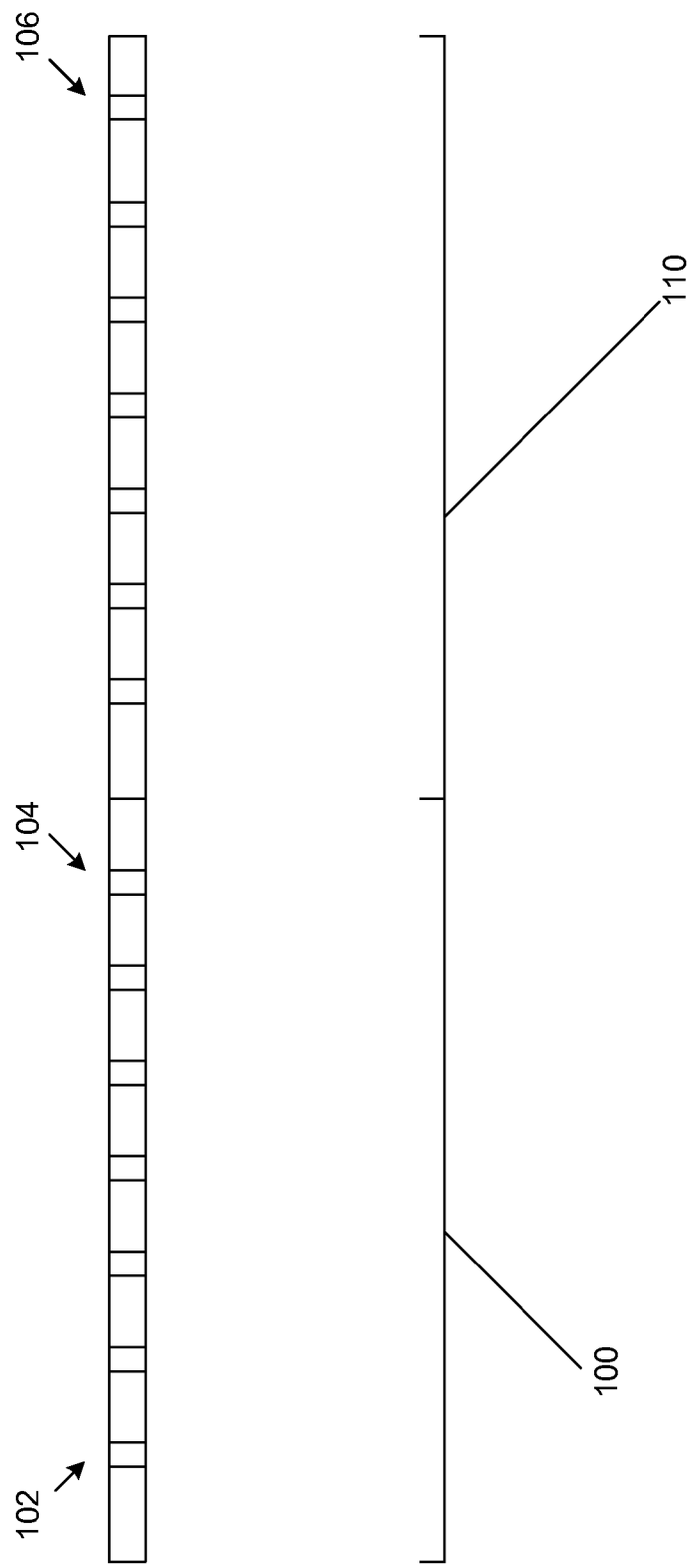
FIG. 1 illustrates first and second frames that may be forwarded from a transmitter to a receiver.
Figure 2:
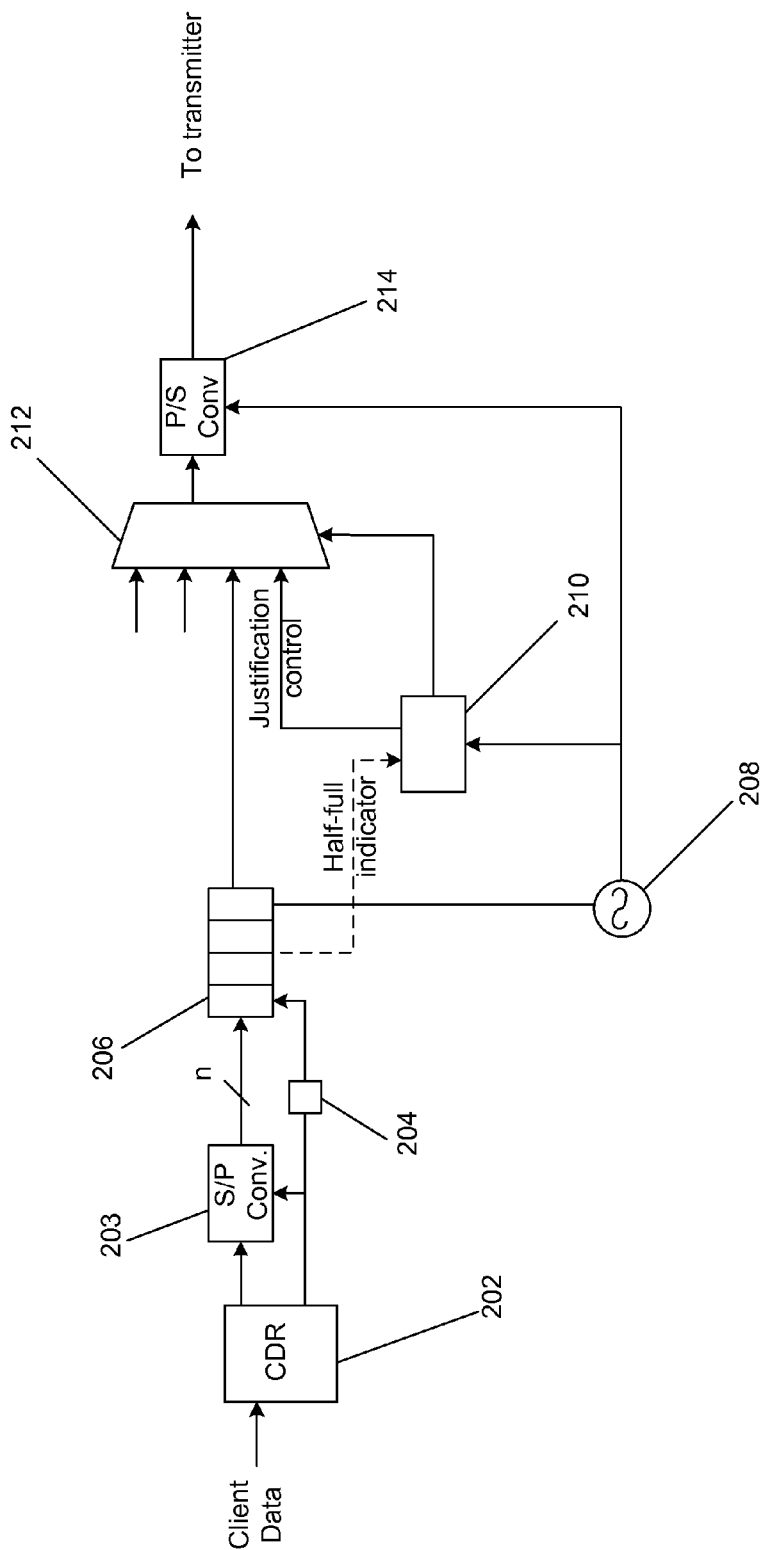
FIG. 2 illustrates an example of a mapping circuit.
Figure 3:
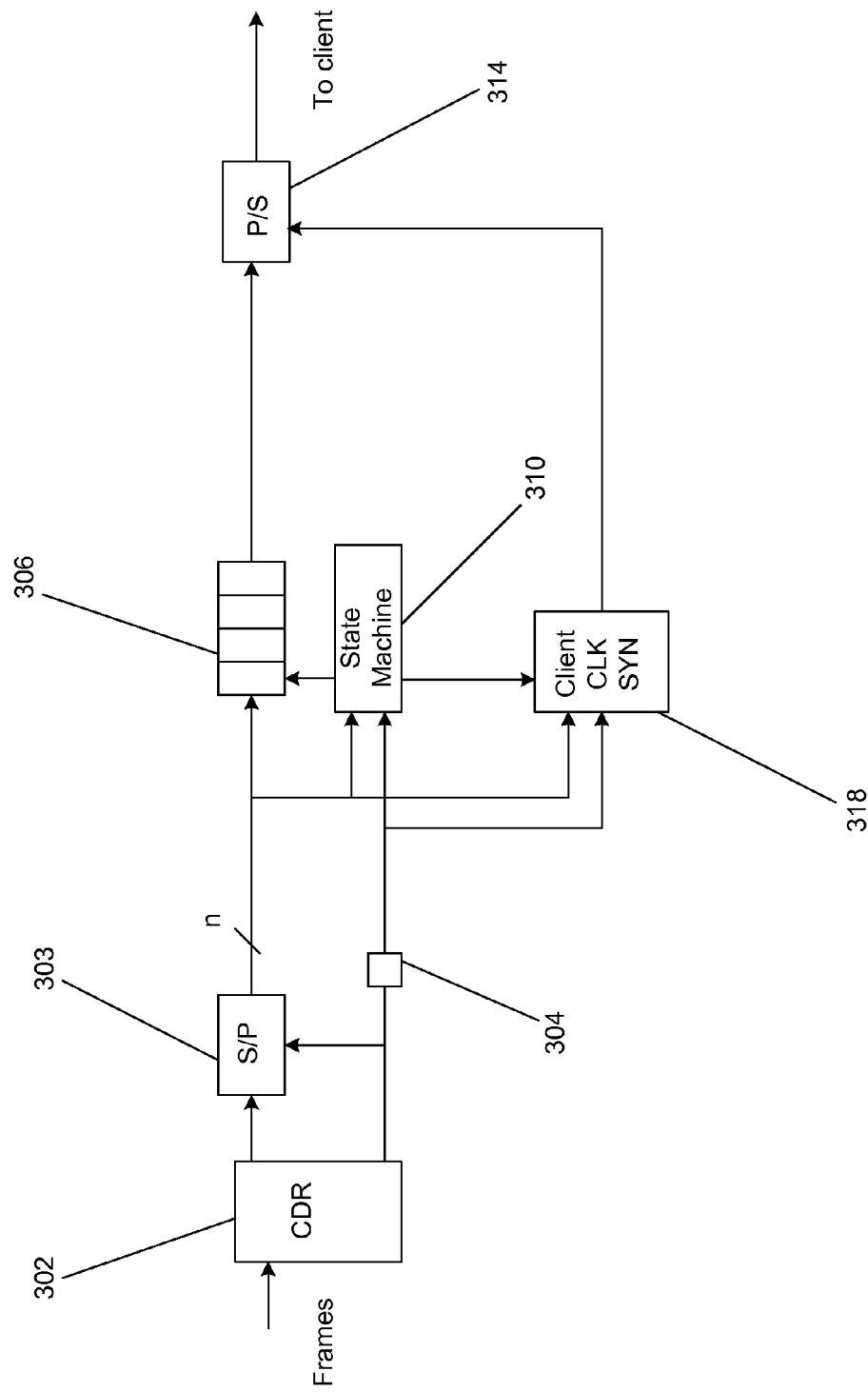
FIG. 3 illustrates an example of a receiver circuit.

Due to the factors noted above, it is advantageous to a) minimize the error term for each phase sample sent from a transmitter to a receiver and b) minimize low-frequency components of the error term $\phi_e(t)$, such that the jitter and wander generated by the transmission process is minimized. It can be seen that the typical method usually employed as described above is thus deficient in two respects. First, the phase information associated with the fixed data locations in the frame is fundamentally granular, in units of the data path width n, and additionally may be non-optimally spaced in the frame. Second, phase information associated with the justifications is also granular in units of n, and can only provide phase corrections on a per-wrapper frame basis. However, to use a data path having a relative narrow data bus width may be complicated inefficient or even unrealizable, given commercially available processing devices, since the narrow width implies a correspondingly higher bus frequency Two techniques are proposed to mitigate the above limitations. These may be implemented together or separately, with the aim to be reduction of the phase error generated by the receiver in the process of reconstructing the client.

The first technique may be referred to as "virtual frame". The virtual frame is a logical construct consisting of a number $N_W$ of sequential values $V_N$. $N_W$ is specified to be the same as the number of data units of width n in the true (transmitted) frame, including client data, overhead, justifications and, if they exist, other data channels that are multiplexed into the same wrapper frame.

Given:

$N_F$ is the number of fixed data units of width n in the wrapper frame

Then, $V_N$ is chosen such that over the wrapper frame:

$$\sum_{k=1}^{N_W} V_N = \sum_{k=1}^{N_F} n$$

And $$\sum_{k=1}^{N_W} (V_N - V_{N(AVG)})^2$$

is minimized. The virtual frame then represents the ideal or optimized distribution of the client data locations over the duration of one wrapper frame, with as little as single-bit granularity. This distribution is typically different than the distribution of client data in the frame.

As an example, assume that the frame includes 1920 16-bit wide data units, and that the number of fixed data locations within the wrapper frame for carrying client data is 1776. Then, if $V_N$ is assigned as $V_1$=14 bits, $V_2$-$V_5$ are 15 bits, $V_6$ is 14 bits . . . $V_{1917}$-$V_{1920}$=15 bits, the sum of $V_N$ over the wrapper frame is (1920/5)*(14+4*15)=28416 bits=1776 16-bit quantities. Graphically, as shown in FIG. 9, the actual or "real" frame 910 that is transmitted within a network may have client data 914 that is not uniformly distributed within frame 910. Virtual frame 912, however, is an example of an optimized distribution of such client data in frame 910, in which the client data 916 is more uniformly distributed.

The second technique may be referred to as "virtual justifications". Virtual justifications are indicative of a difference between the phase associated with the fixed data locations in the wrapper or frame and the actual accumulated phase associated with the client signal, for example, over a series of frames.

The phase data or virtual justifications, however, are decoupled from the data path. Therefore, without complicating the data path, the phase data or virtual justifications may be sent more frequently and with finer granularity than the actual justifications. As discussed below, client data and stuff bytes may be communicated in a first channel, while virtual justifications may be communicated via a second channel or "virtual justification control channel". If the frame includes an overhead portion, the virtual justification control channel can be included in the overhead. There is no need for an actual "virtual justification opportunity" in the frame, because no data is actually sent in conjunction with the virtual justifications.

Reference will now be made in detail to the present exemplary embodiments, which are illustrated in the accompanying drawings. Wherever possible, the same reference numbers will be used throughout the drawings to refer to the same or like parts.

Figure 4A:
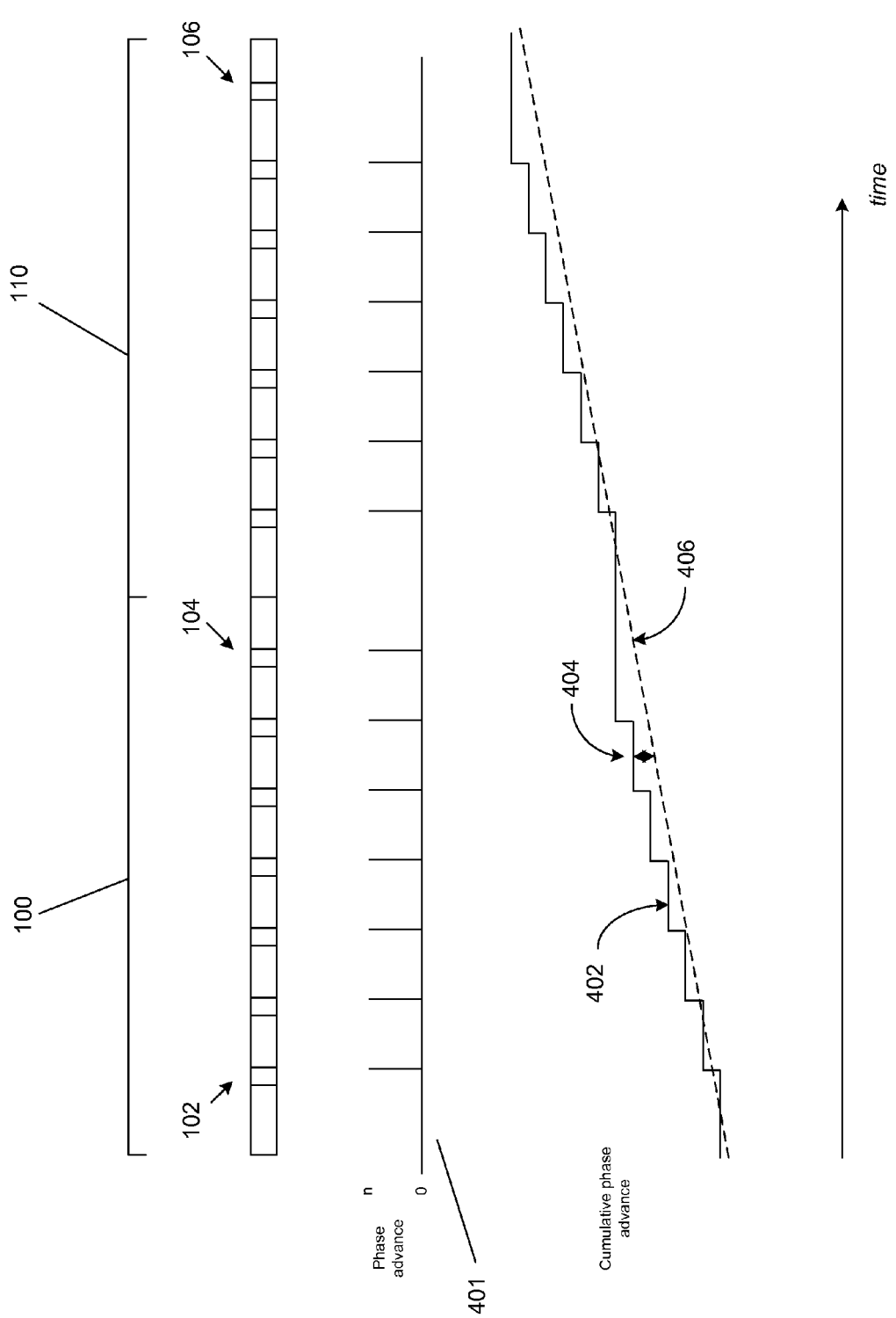
FIG. 4*a* is a timing diagram showing an example of phase advance and cumulative phase advance.
Figure 4B:
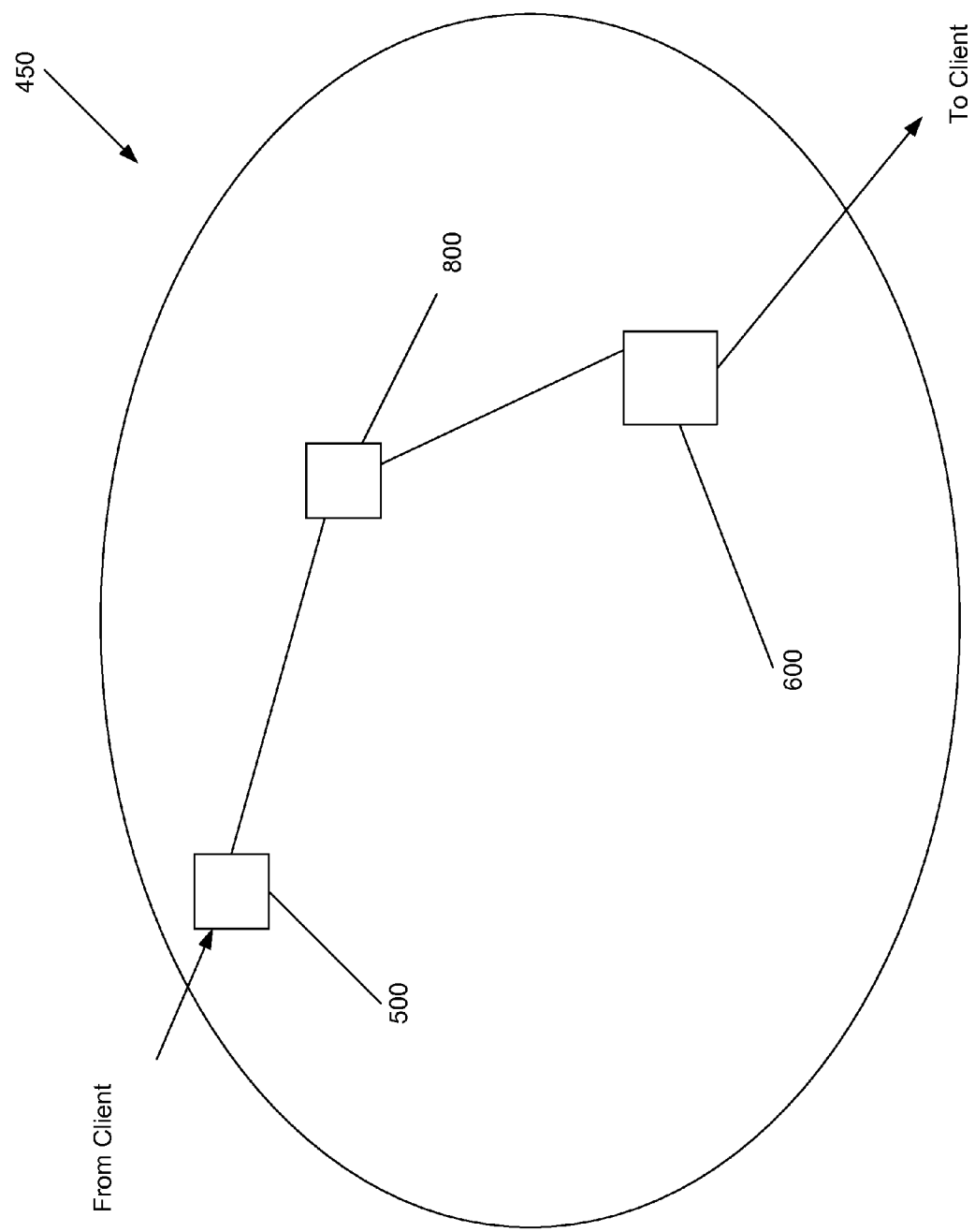
FIG. 4*b* is a block diagram of a communication network consistent with an aspect of the present disclosure.

FIG. 4b illustrates a communication network or system 450 consistent with the present disclosure. Communication system 450 may include an ingress node 500 that receives a client signal having a given frequency and carrying client data, and an egress node 600 that outputs the client data on another client signal having the given frequency. Optionally, one or more intermediate nodes 800 may be provided to relay the client data from ingress node 500 to egress node 600. The structure and operation of nodes 500, 600, and 800 are discussed in greater detail below.

Figure 5A:
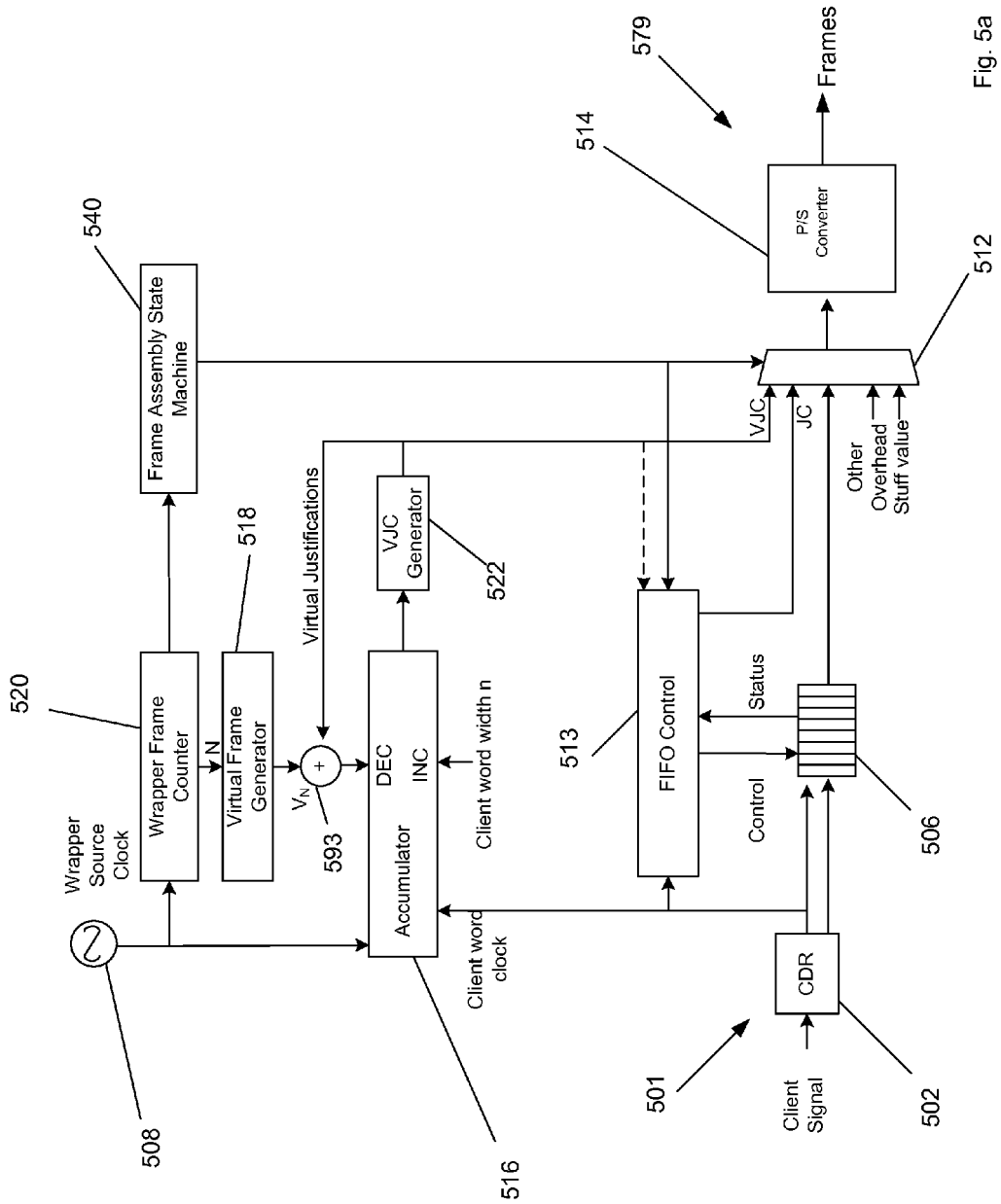
FIG. 5*a* illustrates a block diagram of an ingress node consistent with an aspect of the present disclosure.

FIG. 5a illustrates an example of a communication apparatus (ingress node 500) consistent with an aspect of the present disclosure. Ingress node 500 includes an input 501 that receives a client signal that carries or includes client data. Input 501 may include a clock and data recovery circuit (CDR) 502 that parallelizes the client data to client data words 595 (see FIG. 5b) and generates a clock signal or frequency associated with the client signal. As further shown in FIG. 5b, each client data word 595 has a width of n bits. The parallelized data is output to and stored in an elastic store or memory, such as FIFO (First-in First-out) buffer 506. The wrapper Frame Assembly State machine 540 processes the current location in the frame, as determined by a free-running frame counter 520, which receives an output from wrapper source clock 508. For justification opportunities, the status of the FIFO buffer 506 is examined by FIFO control circuit 513 based on status information supplied to circuit 513 from FIFO buffer 506 and a clock output from CDR 502. If the fill level or the amount of client data in FIFO buffer 506 is above a specified threshold, a data word is unloaded or output from FIFO buffer 506 and supplied to multiplexer 512, which, in turn, combines the data with overhead stuff bits, as well as justification control bits and virtual justification control, as discussed in greater detail below. The output of multiplexer 512 includes parallel frame words 597, which are supplied to output 579 of ingress node 500. Output 579 includes parallel-to serial converters 514 that serializes the words for further transmission. The client data output from FIFO buffer 506 is provided at certain locations in the frame.

Alternatively, if the data fill in FIFO buffer 506 is below the threshold, a fixed "stuff" value is transmitted, and no data is unloaded from FIFO buffer 506. As a result, client data transmitted in the frame is equalized with that the incoming client signal.

As further shown in FIG. 5a, Wrapper Frame counter circuit 520, in response to an output of the wrapper source clock 508, also generates a number N, which is incremented with each clock cycle of wrapper source clock 508. N, which is supplied to a Virtual Frame Generator circuit 518, corresponds to a count of the number of words in the frame that is output from ingress node 500. Based on each number N, Virtual Frame Generator circuit 518 supplies a sequence of values $V_N$ as described above, and is specific to the client rate of the incoming client signal. The sequence of values $V_N$ corresponds to the virtual frame, which, as further noted above, is an optimized distribution of client data in the frame. In FIG. 5a, the Virtual Frame Generator circuit 518 is a memory, in one example, where the address to the memory is the location in the frame or word count N, and the $V_N$ value is the contents of that location. Alternatively, Virtual Frame Generator circuit 518 may be a combinatorial circuit. Values $V_N$ and the virtual justification control (VJC output from VJC generator circuit 522) or phase data is added to one another by adder 593 and supplied to decrement input (DEC) of accumulator 516. Thus, the VJC bytes are generated in response to the optimized distribution data or virtual frame.

Accordingly, for a given location or word count N in the frame an accumulator 516 is decremented by the value $V_N$. Accumulator 516 is also incremented for each received client word, by the number of bits n in the client word.

At predetermined temporal locations in the frame, a "Virtual Justification Control" or VJC word is included. At these locations, the value of the accumulator 516 is assessed. The amount by which the accumulator is above or below a fixed threshold is output as control data to and encoded by VJC generator 522 to supply the VJC bytes. The VJC bytes are next supplied to multiplexer 512, and then output to parallel to serial converter 514. The VJC bytes are also fed to adder 593 and are summed with $V_N$. Accumulator 515 is then decremented by such sum. In particular, accumulator 516 is decremented by the VJC value (if the VJC value is negative, the accumulator is incremented by the absolute value of VJC, |VJC|. Thus, subsequently generated VJC bytes are generated in response to previously generated VJC bytes which are fed back to adder 593.

Accordingly, VJC bytes are the analog to the 'real' JCs, except that they may be bit-granular and are based on a virtualized or optimal distribution of client data in the frame, which, as discussed above, may be more evenly distributed than the data in the real frame. Also, VJCs may have a finer granularity than 'real' justification opportunities. Thus, the VJCs can be used in a manner described below, to supply the client signal at an egress node with the same or substantially the same as the frequency of the client signal input to the system.

For example, the VJCs may have values from 0-4 and be distributed throughout the frame in four locations, whereas the actual data justifications might be in increments of sixteen bits and be contained only once in the wrapper frame. It can be seen that the net virtual and real justifications per frame are the same over time, in this example, but the VJCs are more distributed and more granular. Note that if multiple client channels are encapsulated in the same frame, the VJCs from different channels might be combined in the same frame word for transmission efficiency.

As further shown in FIG. 5a, justification control (JC) bytes are also supplied to multiplexer 512 from FIFO control circuit 513. In addition, parallel frame words are output from multiplexer 512.

It is noted that the stuff bytes, JC bytes, and client data may be provided in a first channel and the VJC bytes may be provided in a second channel. As used herein, a channel may constitute one or more time slots in a time division multiplexed (TDM) signal. Alternatively, the channel may constitute a packet, or may be transmitted on a particular wavelength. In that case, the first channel carrying the client data, JC bytes and stuff bytes may be carried by an optical signal having a first wavelength, and the VJC bytes may be carried by an optical signal having a second wavelength.

FIG. 5c shows an example of an exemplary frame 900 that may be output from ingress node 500 consistent with an aspect of the present disclosure. Frame 900 includes client data provided at temporal locations or time slots (channels), such as location 902, and virtual justification control (VJC) bits at temporal locations or time slots (channels) 912 and 914. Justification control bits may also be included in frame 900 at temporal locations 916, as well as a justification opportunity bits at location 904. As noted above, the justification opportunity bytes may include data (e.g., a further portion of the client data which is not included at the other data locations in frame 900) or null or stuff bytes. In the example shown in FIG. 5c, the VJC locations 912 and 914 may be uniformly spaced within frame 900. Alternatively, as noted above, VJC bytes may be included in packets interspersed, for example, with frames or packets carrying the client data.

Figure 6:
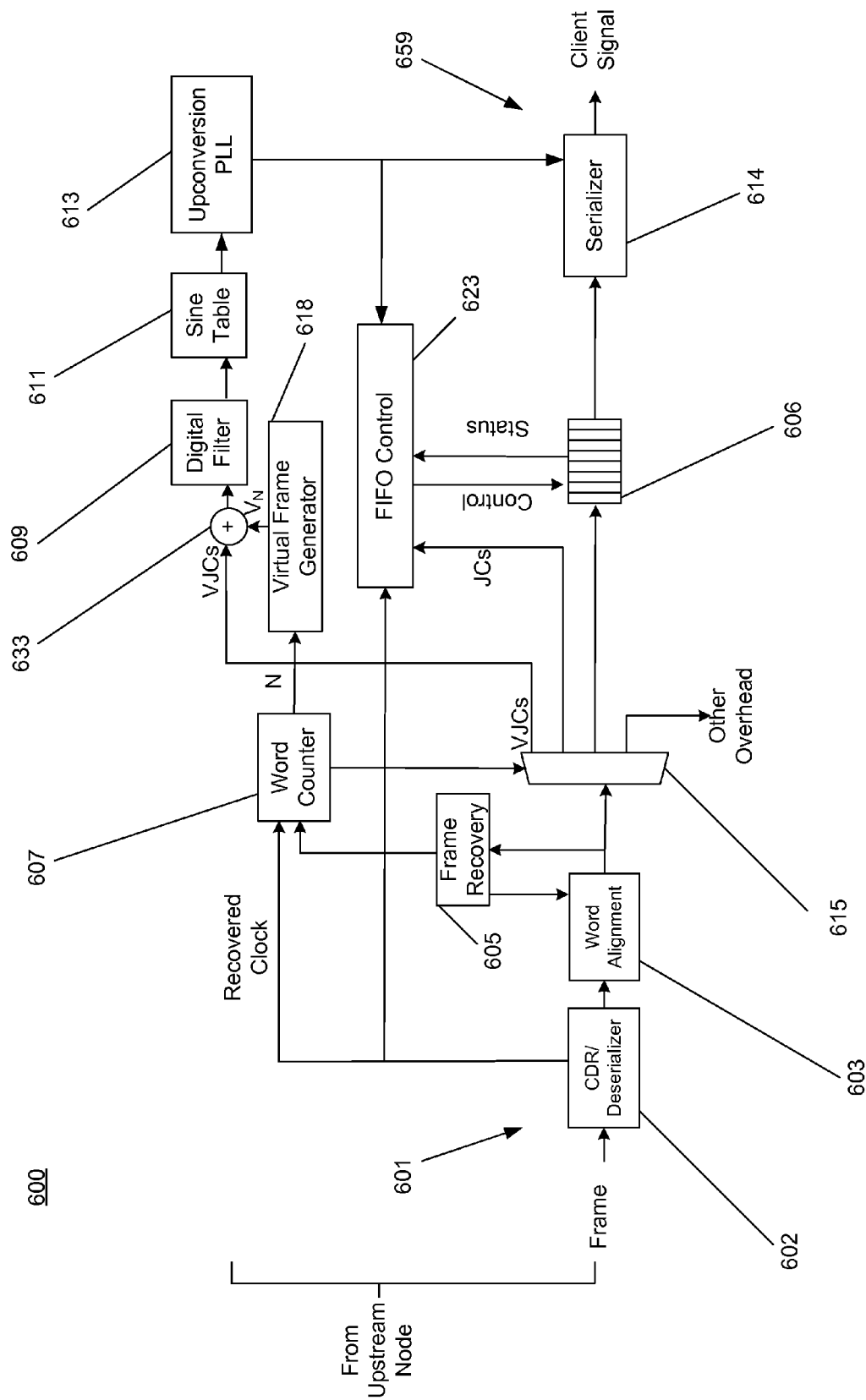
FIG. 6 illustrates an example of an egress node consistent with the present disclosure.

FIG. 6 shows an example of egress node 600 consistent with an additional aspect of the present disclosure. Egress node 600 has an input 601 that includes a clock and data recovery/deserializer circuit 602 that receives frames from an upstream node, extracts data and a clock from the frame and generates parallel frame words including the extracted data. The frame words are supplied to word alignment circuit 603 that detects the beginning of the frame and aligns the words of client data with each frame word. The aligned words of frame data are forwarded to demultiplexer 615, and, based on the temporal location in the frame, demultiplexer 615 extracts data from fixed locations in the frame, as well as justification opportunities. The client data is then stored a memory, such as first-in-first-out (FIFO) buffer 606. Justification control bits (JCs) are also extracted by demultiplexer 615 and used by FIFO Control circuit 623, along with the extracted frame clock or frequency from CDR/Deserializer 602 and a frequency output from upconversion phase lock loop (PLL) 613, to determine whether a justification opportunity contains data. If it does, the data is stored in FIFO buffer 606 under control of circuit 623, and if not, the data is discarded. FIFO Control circuit 623 also monitors the status of FIFO buffer 606. Additionally, Virtual Justification Control (VJC) bytes or phase data are extracted from the frame by demultiplexer 615, as well as other overhead.

As further shown in FIG. 6, Frame Recovery circuit 605 also receives the aligned frame words from word alignment circuit 603 and supplies a control signal to word alignment circuit 603 to control or adjust the output of the aligned frame words. Frame recovery circuit 605 also supplies an output to word counter circuit 607 that generates a word count (N) based on such output as well as the recovered frame clock or frequency from CDR/Deserializer circuit 602. Word count N or frame position is supplied to virtual frame generator circuit 618 to generate virtual frame values $V_N$, which are indicative of an amount of client data at a particular temporal location, if such client data were distributed in the frame based on an ideal or optimized distribution. As noted above, virtual frame generator circuit 618 may constitute a memory that stores the $V_N$ values, or a combinatorial circuit. At the VJC locations in the frame, the VJC value is summed by adder 633 with the $V_N$ value for that location. The sum of the $V_N$ values and VJCs is applied to a digital filter 609. The net phase (or bit count) applied to digital filter 609 may be exactly the same as the net phase information at the INCREMENT input of the accumulator 516 in FIG. 5a, and also equal to the net client data transmitted and recovered.

Digital filter 609 applies further smoothing such that the phase information is averaged over time. The time constant of digital filter 609 is determined by the desired wander filtering characteristic desired. The phase information at the output of digital filter 609 may be used directly or may be applied to sine/cosine look up table 611 to obtain a frequency that is the same or a sub-multiple of the recovered client frequency. The resulting frequency may be further multiplied if necessary by upconversion phase lock loop (PLL) 613 to obtain the recovered client clock, which is supplied to serializer circuit 614 and is provided by output 659 of egress node 600.

Under control of FIFO control circuit 623, FIFO buffer 606 outputs client data in parallel words to serializer (parallel-to-serial converter) circuit 614, which converts the parallel words to a serial data stream or serial client signal. The frequency of the output client signal is supplied by the upconversion PLL circuit 659 or may be supplied direction from sine/cosine look up table 611. As noted above, the output client frequency may be the same or substantially the same as the frequency of the client signal supplied to ingress node 200.

Figure 7:
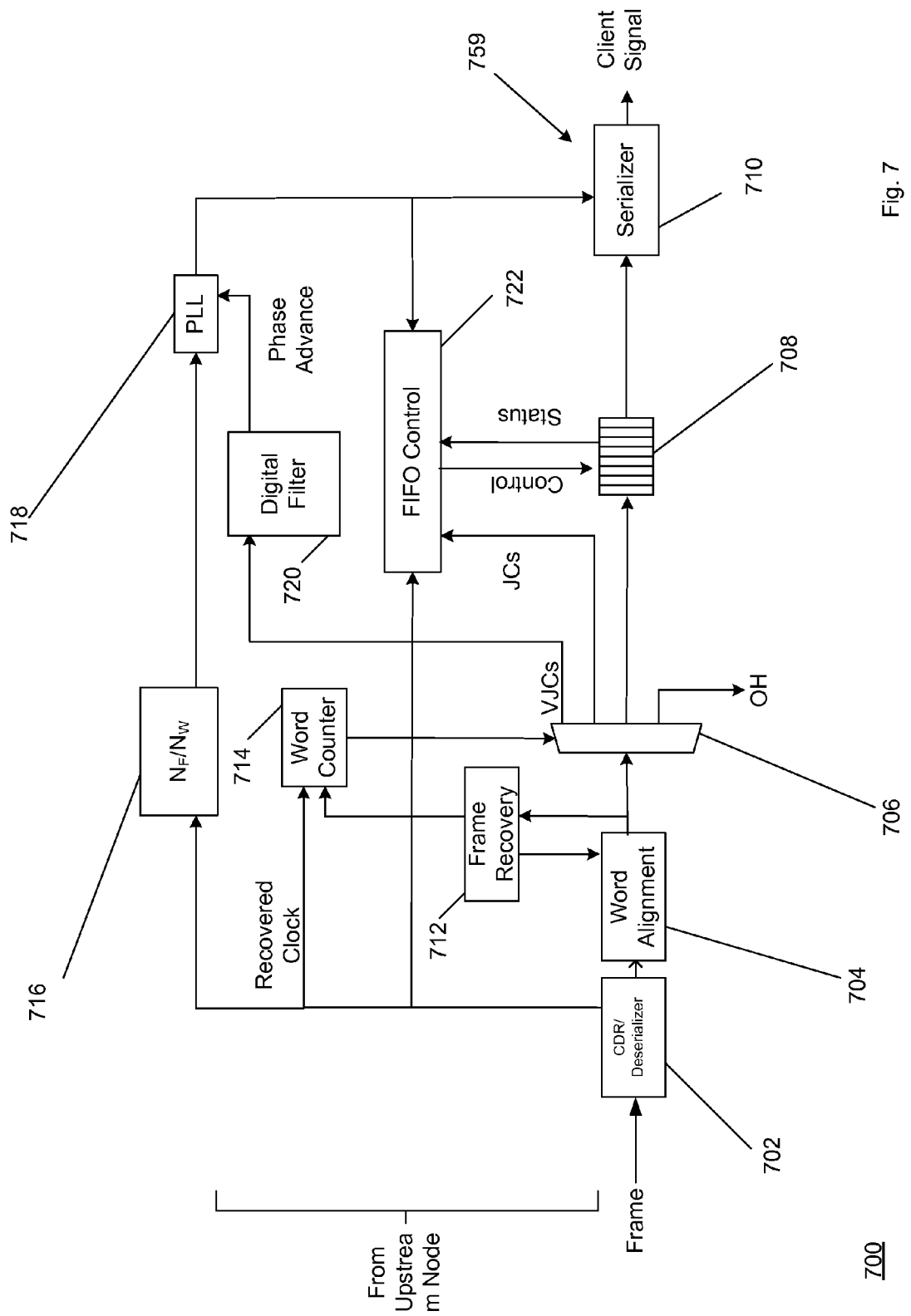
FIG. 7 illustrates an example of an alternative egress node consistent with the present disclosure.

FIG. 7 illustrates an alternative egress node 700 consistent with an additional aspect of the present disclosure. Egress node 700 includes CDR/Deserializer circuit 702, word alignment circuit 704, frame recovery circuit 712, demultiplexer 706, word counter 714, FIFO control circuit 722, FIFO buffer circuit 708, and serializer 710 that have the same or substantially the same structure and operate in the same or substantially the same manner as corresponding circuitry discussed above in connection with FIG. 6 (e.g., CDR/Deserializer circuit 602, word alignment circuit 603, frame recovery circuit 605, demultiplexer 615, word counter 607, FIFO control circuit 623, FIFO buffer circuit 606, and serializer 614). As further shown in FIG. 7, the extracted frame frequency from CDR/deserializer circuit 702 is multiplied by a factor $N_F/N_W$ by analog multiplier 716, where $N_F$ is the number of fixed data locations in the received frame or wrapper and $N_W$ is the overall number of words in the wrapper. The frequency output from multiplier 716 is next supplied to an analog phase lock loop (PLL) 718. In addition, the periodic VJC values output from demultiplexer 706 are filtered in digital filter 720 over a relatively long time constant and also supplied to PLL 718. As a result, the output of digital filter 720 advances the phase generated by an analog PLL 718 by a desired amount. As further shown in FIG. 7, the output of PLL 718 is supplied to serializer 710 so that the client signal has the desired frequency when supplied from output 759. The output of PLL 718 is also supplied to FIFO control circuit 722 to provide further control of FIFO buffer circuit 708.

Thus, the net encoding/decoding process discussed above provides phase information to receiver (egress node 600, 700) that is more accurate, due to both the bit-level granularity of the transmitted phase information, and also to the more frequent phase information updates. Thus, the wander generated by the encoding/decoding process is greatly minimized. Additionally, any generated wander is higher in frequency relative to the conventional method, and is thus more effectively filtered by the combined digital and analog filtering present at the decoder (egress node 600, 700). However, the data path, i.e., the transmission path of data through CDR/Serializer 602, Word Alignment circuit 603, demultiplexer 615, FIFO buffer 606, and serializer 614, for example, remains relatively simple and may still operate on the same word clock frequency as the conventional receiver circuit 300 discussed above. Moreover, rotation or barrel-shifting of the data is not required to adapt the data path to a format that is bit-granular.

Figure 8:
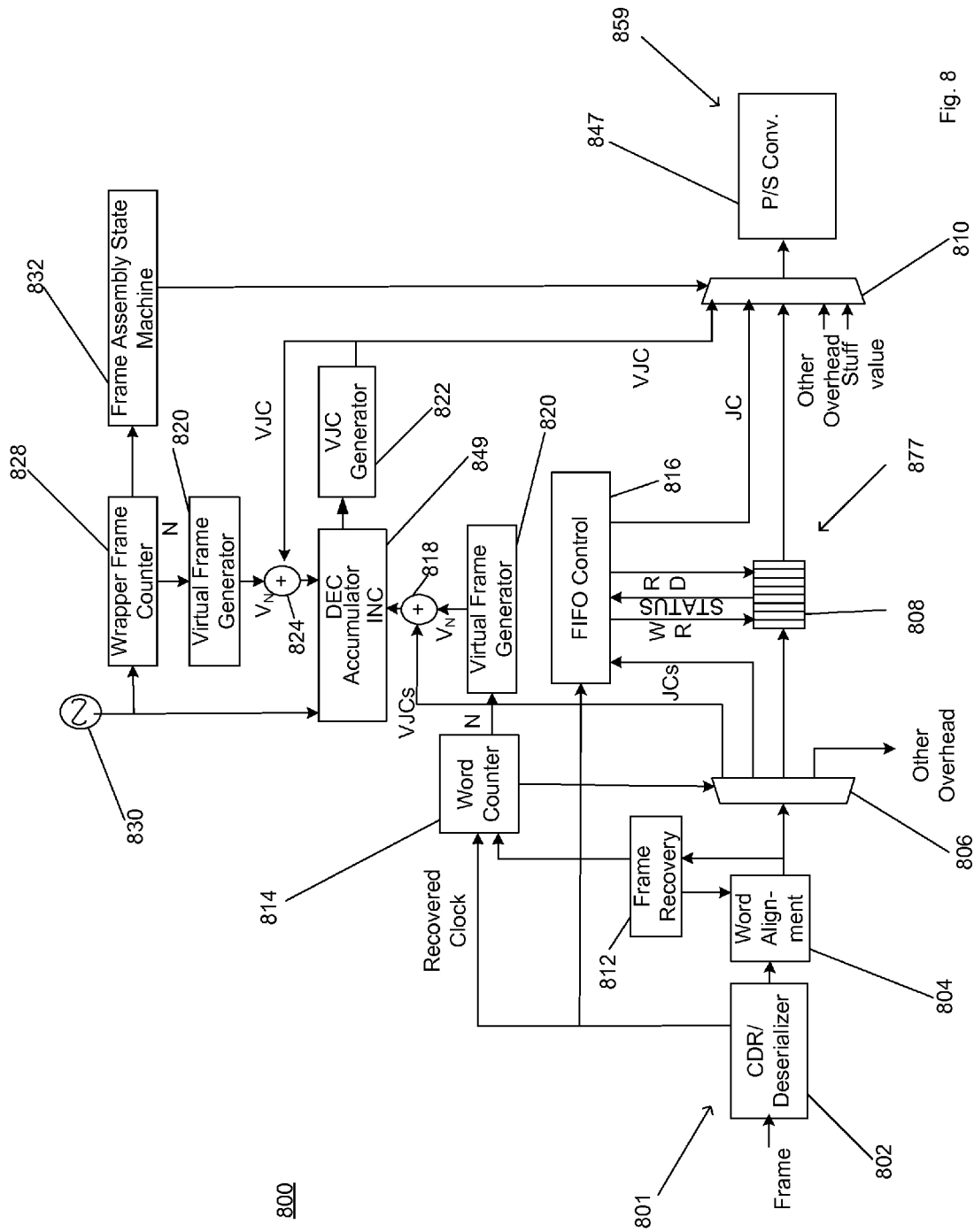
FIG. 8 illustrates an example of an intermediate node consistent with the present disclosure.

Often, a given client signal that is encoded or included in a frame as discussed above is transmitted through a series of one or more intermediate nodes (e.g., node 800 shown in FIG. 4b), wherein each node generates a wrapper that is plesiochronous with the other wrappers or frames. As before, each wrapper may contain more than one client signal, and at each intermediate node 800, the multiple clients may be switched and combined in different wrappers. At each such intermediate node 800, the client is preferably recovered from the upstream node wrapper and re-encoded downstream to the next node. In addition, the client phase information is preferably recovered and re-encoded. FIG. 8 illustrates an exemplary intermediate node 800 using the virtual frame and virtual justifications discussed above.

Intermediate node 800 includes features of ingress node 500 and egress node 600. In main data path 877, the client data received form input 801 is decapsulated and re-encapsulated in increments of the frame word, using the encoded JCs, and generating new JCs downstream. In particular, CDR/Deserializer 802, word alignment circuit 804, frame recovery circuitry 812, demultiplexer 806, word counter circuit 814, FIFO control circuit 816, FIFO buffer 808, and virtual frame generator 820, have the same or substantially the same structure and operate in the same or substantially corresponding circuits in egress node 600 (CDR/Deserializer 602, word alignment circuit 603, demultiplexer 615, word counter 607, FIFO control circuit 623, FIFO buffer 606, and virtual frame generator 618) to generate the sequence of values $V_N$. As noted above, $V_N$ is indicative of a number of client data bits in each word of an optimized or ideal distribution of client data in a frame. The values $V_N$ are added to the virtual justification control (VJC) bits by adder 818 and the sum is supplied to the increment input INC of accumulator 849.

As further shown in FIG. 8, intermediate node 800 includes clock 830, wrapper frame counter 520, virtual frame generator 820, frame assembly state machine 832, and virtual frame generator 820 that function in a similar manner as corresponding circuits in ingress node 500 (clock 508, wrapper frame counter 520, virtual frame generator 518, adder 593, frame assembly state machine 540, and virtual frame generator 518) to generate additional $V_N$ values that are added to virtual justification control bits by adder 824. The sum output from adder 824 is supplied to the decrement input DEC of accumulator 849, and the output of accumulator 849 is supplied to VJC generator circuit 822, which supplies virtual justification control (VJC) bits to multiplexer 810.

Under control of FIFO control circuit 816, write and read commands are supplied to FIFO buffer 808 to control the storing of client data to and the output of client data from FIFO buffer 808. Status information is also supplied to FIFO control circuit 816. Client data output from FIFO buffer 808 is supplied to multiplexer 810, which combines the client data with VJC bits, justification control (JC) bits, other overhead, and stuff values. Under control of the frame assembly state machine 832, multiplexer 810 supplies an output to parallel to serial (P/S) conversion circuit 847, which, in turn, supplies a serial data stream from output 859.

Generation of VJC bits or phase data will next be described in greater detail. Namely, the combined virtual frame values $V_N$ from the incoming wrapper or frame are summed by adder 818 with the received Virtual Justifications from the incoming wrapper or frame supplied to input 801 and used to increment the accumulator 849. Similarly, the virtual frame sequence $V_N$ from the outgoing frame or wrapper supplied at output 859 is summed by adder 824 with the generated outgoing VJCs and used to decrement accumulator 849. The output of the accumulator or the accumulator value is supplied to VJC generator 822, which outputs the VJC bits. For example, outgoing VJCs are output based on whether the value of accumulator 849 is above or below a threshold. Thus, the net phase information received through input 801 and net phase information transmitted from output 859 corresponding to the encapsulated client is equivalent, even though the wrapper frequencies are not locked.

In a concatenated series of nodes, it is possible for any wander generated by the encoding/decoding process to be cumulative. Hence, the amount of wander generated by each decoding/encoding process may be diminished or mitigated to achieve a given net result. The virtual frame and virtual justifications techniques discussed above may therefore be even more important when it is desired to pass a given signal through a concatenated series of nodes, each generating a wrapper that is pleisochronous to the others.

Intermediate node 800 receives and outputs frames that typically have the same structure and frequency, but the technique is not limited to this. Wrappers or frames with different frequencies, fixed data locations, justification opportunities, justification control channels, and word widths may also be supplied to and output from intermediate node 800.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A communication apparatus, comprising:
   an input configured to receive a client signal, the client signal having an associated first frequency and carrying client data;
   an output configured to output a frame that includes first portions of the client data, stuff bytes, and justification control (JC) bytes, the JC bytes indicating whether the stuff bytes include second portions of the client data, the client data, stuff bytes, and justification control bytes being included in a first channel; and
   circuitry configured to supply virtual justification control (VJC) bytes, the VJC bytes being included in a second channel, the VJC bytes being indicative of a distribution of the client data in the frame,
   wherein the circuitry includes an accumulator that supplies control data indicative of the VJC bytes,
   wherein the frame includes a plurality of first words and the client signal includes a plurality of second words, each of the plurality of second words having a bit width, and each of the plurality of first words including selected bytes of the client data, the accumulator supplying the control data in response to a number of the selected bytes of client data and the bit width.

2. A communication apparatus, comprising:
   an input configured to receive a client signal, the client signal having an associated first frequency and carrying client data;
   an output configured to output a frame that includes first portions of the client data, stuff bytes, and justification control (JC) bytes, the JC bytes indicating whether the stuff bytes include second portions of the client data, the client data, stuff bytes, and justification control bytes being included in a first channel; and
   circuitry configured to supply virtual justification control (VJC) bytes, the VJC bytes being included in a second channel, the VJC bytes being indicative of a distribution of the client data in the frame,
   wherein the circuitry includes an accumulator that supplies control data indicative of the VJC bytes,
   wherein the accumulator is incremented to indicate a number of bits of the client data received by the input and the accumulator is decremented based on a net amount of client data transmitted in the frame.

3. The communication apparatus in accordance with claim 2, wherein an amount that the accumulator is decremented is a virtual frame that represents an optimized distribution of the client data in the frame.

4. The communication apparatus in accordance with claim 1, wherein the circuitry includes a combinatorial logic that generates a virtual frame, the virtual frame being representative of an optimized distribution of the client data in the frame.

5. The communication apparatus in accordance with claim 1, further including a memory, the memory storing the number of selected bytes of client data, and outputting the number of selected bytes of client data in response to an identifier indicative of a temporal location of the selected bytes of client data within the frame.

6. The communication apparatus in accordance with claim 5, wherein the identifier is an address of the memory, the address being associated with a current position in the frame, and a location in the memory associated with the address storing an optimized number of bits in the frame.

7. The communication apparatus in accordance with claim 1, further including:
   a memory that stores at least one of the first portions of the client data; and
   a multiplexer that receives the VJC bytes and said at least one of the first portions of the client data, the multiplexer supplying the VJC bytes and said at least one of the first portions of the client data.

8. The communication apparatus in accordance with claim 7, wherein the memory includes a first-in-first-out buffer.

9. The communication apparatus in accordance with 1, wherein the VJC bytes are provided at uniformly spaced temporal locations in the frame.

10. A communication apparatus, comprising:
    an input configured to receive a frame that includes first portions of client data, stuff bytes, and justification control (JC) bytes, the JC bytes indicating whether the stuff bytes include second portions of the client data, the frame having an associated first frequency, the client data, stuff bytes, and JC bytes being included in a first channel, the input also receiving a second channel that includes a virtual justification control (VJC) byte, the VJC byte being indicative of a distribution of the client data in the frame; and
    an output configured to supply a client signal including the first portions of the client data, the client signal having an associated second frequency; and
    circuitry configured to generate the second frequency based, at least in part, on the VJC bytes,
    wherein the circuitry further includes a digital filter,
    wherein the adder has an output that supplies a sum of the number of the selected bytes of client data and the VJC bytes, the sum being supplied to the digital filter, the sum being one of a plurality of sums, the digital filter outputting an average of the plurality of sums.

11. The communication apparatus in accordance with claim 10, wherein the circuitry includes an adder,
    wherein an output of the adder is indicative of a net phase associated with the client data.

12. The communication apparatus in accordance with claim 10, wherein the VJCs are generated by the circuitry based on an optimized distribution of client data in the frame.

13. The communication apparatus in accordance with claim 10, further including a memory, the memory storing a look-up table, the memory being configured to receive an output of the digital filter and supply a value of the second frequency in response to the output of the digital filter.

14. The communication apparatus in accordance with claim 10, further including a memory, the memory storing a look-up table, the memory being configured to receive an output of the digital filter and supply a value of a sub-multiple of the second frequency.

15. The communication apparatus in accordance with claim 10, wherein the VJC bytes are provided at uniformly spaced temporal locations in the frame.

16. The communication apparatus in accordance with claim 10, further including a phase-locked loop circuit that supplies the second frequency in response to VJC bytes.

17. A communication node configured to be provided in a communication network, comprising:
    an input configured to receive a first frame that includes first portions of client data, first stuff bytes, and first justification control (JC) bytes, the first JC bytes indicating whether the first stuff bytes include second portions of the client data, the first frame having an associated first frequency, a client signal carrying the client data being supplied to the communication network, the client signal having an associated second frequency, the first frame including the client data, the first frame including first virtual justification control (VJC) bytes, the first VJC bytes being indicative of a distribution of the client data in the first frame; and circuitry configured to supply a second frame that includes second portions of the client data, second stuff bytes, and second justification control (JC) bytes, the second JC bytes indicating whether the second stuff bytes include the fourth portions of the client data, the second frame having the associated first frequency and including second VJC bytes, wherein the second frame includes a plurality of first words and the client signal includes a plurality of second words, each of the plurality of second words having a bit width, and each of the plurality of first words including selected bytes of the client data, the circuitry supplying the second VJC bytes in response to a number of the selected bytes of client data and the bit width.

18. The communication node in accordance with claim 17, wherein the circuitry includes an accumulator.

19. The communication node in accordance with claim 17, wherein the first VJC bytes are provided at uniformly spaced temporal locations in the first frame.

20. The communication node in accordance with claim 17, wherein the second VJC bytes are provided at uniformly spaced temporal locations in the second frame.

21. A communication apparatus, comprising:

an input configured to receive a client signal, the client signal having an associated first frequency and carrying client data;

an output configured to output a frame that includes first portions of the client data, stuff bytes, and justification control (JC) bytes, the JC bytes indicating whether the stuff bytes include second portions of the client data, the frame having an associated second frequency, the first portions of the client data, the stuff bytes, and the JC bytes being included in a first channel; and circuitry configured to supply virtual justification control (VJC) bytes, the VJC bytes being included in a second channel, wherein the frame includes a plurality of first words and the client signal includes a plurality of second words, each of the plurality of second words having a bit width, and each of the plurality of first words including selected bytes of the client data, the circuitry supplying subsequent VJC bytes in response to a number of the selected bytes of client data, the bit width, and prior VJC bytes.

* * * * *